Dec. 25, 1962  R. P. KAISER ETAL  3,070,735
SERVO SYSTEM
Filed Sept. 28, 1959  2 Sheets-Sheet 1

INVENTORS
ARTHUR G. DAULTON
ROBERT P. KAISER
BY
ATTORNEY

Dec. 25, 1962   R. P. KAISER ETAL   3,070,735
SERVO SYSTEM
Filed Sept. 28, 1959   2 Sheets-Sheet 2

INVENTORS
ARTHUR G. DAULTON
ROBERT P. KAISER
BY
*Robert C. Smith*
ATTORNEY

United States Patent Office 3,070,735
Patented Dec. 25, 1962

3,070,735
SERVO SYSTEM
Robert P. Kaiser, South Bend, Ind., and Arthur G. Daulton, Highland, Ill., assignors to The Bendix Corporation, a corporation of Delaware
Filed Sept. 28, 1959, Ser. No. 842,924
10 Claims. (Cl. 318—436)

This invention relates to control amplifiers and more particularly to a servo amplifier used in a system employing hydromechanical components which amplifier uses magnetic amplifiers and incorporates certain unique features to provide feedback means to achieve a desired stability of the system.

Magnetic amplifiers have demonstrated great utility in control systems for airborne equipment because of their resistance to damage from vibration and over-all dependability. They are particularly useful where it is necessary to amplify signals from sensing elements which produce very low level direct current voltages such as thermocouples. It is well known to provide servo systems in which an electrical amplifier drives a motor, either mechanical or electrical and in which proportional or type-0 stabilization is provided by the feedback means in the amplifier and an integrating or type-1 action is provided by the inherent action of the motor. A type-0 servomotor is one known in the art as a servo producing an output proportional to a constant actuating error input signal. Thus a small error input will displace the output member a given small amount and a larger error input will displace the output a greater amount. Thus, in order to have an output displacement from a given norm position it is necessary to have an existing error input signal and the displacement from the norm position is proportional to the magnitude of the error signal. A type-1 servo is one wherein the output member is displaced at a rate proportional to the error signal. The output member of a type-1 will continue to move as long as an error input signal exists and thus will correct the control variable until there is a zero error signal, and it is only the rate of correction that varies with the magnitude of the error signal. The type-1 servo is considered an "integrating acting" servo in that the variation of the output member is the integral of the error input rather than a direct proportion as in the case of a type-0 servo. The practical effect of an integrating system may be produced through the use of a system having a very high steady state gain and very long time constant.

While the desirability of including electrical or hydromechanical motors which have inherent integrating action is well known, a certain amount of resistance towards using these components has become apparent because of hysteresis and friction associated with bearings and seals. In the case of hydromechanical motors, it is frequently necessary to provide large volume pistons and cylinders involving considerable weight and size in order to get the desired time constants. An integrating hydromechanical servo valve structure or an electrical motor will respond to any signal appearing at its input. This may include disturbances which are not related to the system error signal. It is therefore an object of the present invention to provide a servo system in which a section functionally equivalent to an integrator is placed in close proximity to the source of the system error signal so that said section will be effective to eliminate, rather than amplify, these disturbances.

It is another object of the present invention to provide a servo system incorporating both electrical and hydromechanical components in which the mechanical components may be simplified through the use of a magnetic servo amplifier having the advantages of both proportional or type-0 stabilization and integrating or type-1 stabilization.

It is another object to provide a magnetic servo amplifier having a very long time constant and a very high gain in order to get the desired stabilization for the associated engine and hydromechanical control equipment.

It is a further object to provide a magnetic servo amplifier incorporating the above objects and in which means are provided to insure that the transfer function of the integrating amplifier section is such that the amplifier never reaches an operating condition where the slope of the transfer curve becomes negative.

It is a further object to provide certain unique means for achieving type-1 or integrating stabilization in a magnetic servo amplifier.

Other objects and advantages will become apparent from the following specification and the accompanying drawings in which.

Figure 1:
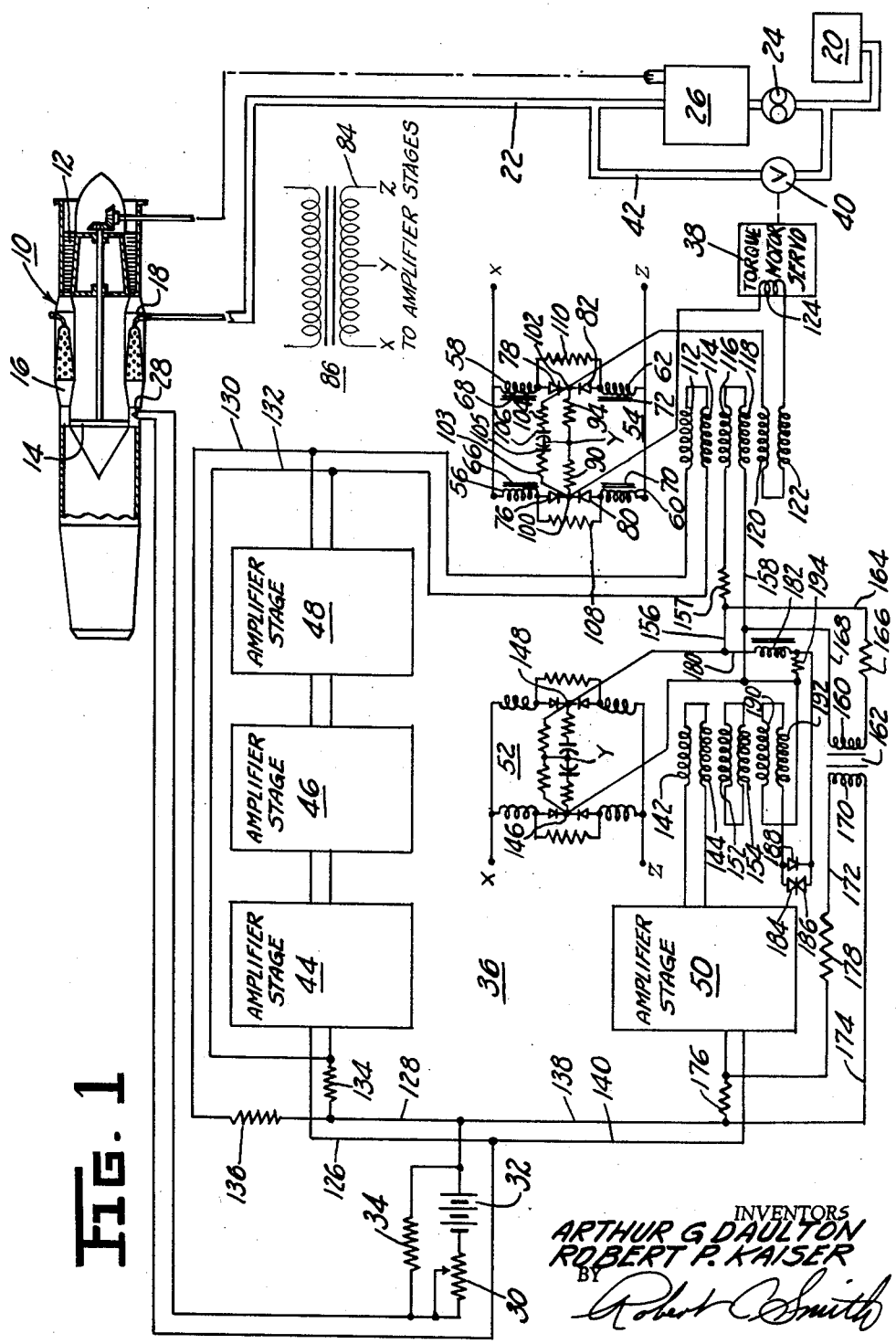
FIGURE 1 shows a schematic drawing of our magnetic servo amplifier in association with a gas turbine engine and fuel system.

Referring to FIGURE 1, a gas turbine engine is shown generally at numeral 10 having a compressor 12, a turbine 14, and a plurality of combustion chambers 16 which are supplied with fuel from a fuel manifold 18. Fuel is supplied to the manifold 18 from a source 20 through a conduit 22 including a pump 24 and the quantity of fuel supplied to the engine is controlled by means of a main fuel control 26 which may be of the type shown in Patent No. 2,786,331, issued to Howard J. Williams. The turbine inlet temperature is sensed by means of a thermocouple 28 which produces a voltage varying with the temperature sensed and this voltage is supplied to a temperature reference circuit including a variable resistor 30, a direct current voltage source which is shown as a battery 32, and a resistor 34 in parallel with said variable resistor and said battery. This reference voltage is supplied in opposition to the thermocouple voltage and the output of this circuit is a direct current voltage varying in phase and magnitude with the direction and extent of departure of the thermocouple voltage from the reference voltage respectively. This error voltage is amplified in a magnetic amplifier shown generally at numeral 36 and this amplified signal is used to drive a torque motor 38 which controls the operation of a servo valve in a well known manner to provide a mechanical actuation of a valve 40. Valve 40 is located in a bypass line 42 which is connected to withdraw metered fuel from the downstream side of the main fuel control 36 and to bypass this fuel to the upstream side of the pump 24. When a temperature error is sensed, the valve 40 is movable to vary the amount of bypass fuel flow depending upon the magnitude of the temperature error signal.

The temperature error signal supplied at the output of the temperature reference circuit above described, is supplied to two separate amplifier sections, one of which incorporates proportional feedback, and which includes amplifier stages 44, 46 and 48 and the other which has characteristics similar to integrating or type-1 systems including amplifier stages 50 and 52. Each of these amplifier sections is connected to an output stage 54 which supplies torque motor 38. Amplifier stages 44, 46 and 48 have not been shown in detail inasmuch as they are entirely conventional and, with certain few exceptions hereafter noted, essentially identical to the stages 52 and 54.

While the amplifier sections shown are fairly conventional, as to overall arrangement, it may be desirable to provide a brief discussion of the operation of the output stage 54 as an example of a stage typical of all of those shown. This stage shows four separate branches arranged in an inverse-parallel full-wave configuration. The four separate branches contain alternating current power windings 56, 58, 60 and 62 inductively associated with magnetic core members 66, 68, 70 and 72 respectively. Each of these branches also contains a unidirectional conduction device in the form of a rectifier, rectifier 76 being connected in series with power winding 56 and rectifiers 78, 80 and 82 being connected in series with windings 58, 60 and 62 respectively. This amplifier is supplied with alternating current from the secondary winding 84 of a transformer 86 having one end connected to a terminal point $x$, the other end connected to a terminal point $z$, and a center tap connected to terminal point $y$. The various branches are connected to this power supply such that when terminal $x$ is positive, current will be caused to flow simultaneously through power winding 56, rectifier 76, a dummy load resistor 90, and back to the center tap of the power supply and also through power winding 58, rectifier 78, a dummy load resistor 94, and back to the center tap. During the opposite half cycle of the supply voltage current flows simultaneously through power winding 60, rectifier 80, resistor 90 and back to the center tap and through power winding 62, rectifier 82, resistor 94 and back to the center tap. The output voltage of the stage shown is measured between a pair of terminals 100 and 102 and appears across the dummy load resistors 90 and 94 having their common terminals connected to the center tap $y$. In the absence of the control signal being impressed on the signal windings, discussed below, the voltage across the dummy load resistors should balance out and there will be no voltage between the terminals 100 and 102. A shunt resistor 108 is connected across rectifiers 76 and 80 and another shunt resistor 110 is connected across rectifiers 78 and 82 and these resistors provide means for resetting the respective cores during the half cycles when their corresponding power windings are not conducting or "gating" and they also act to provide a certain amount of negative feedback for stabilization. In the amplifier shown, it is obvious that the branches must be rather carefully balanced and these reset resistors tend to compensate somewhat for temperature and aging effects of the rectifiers which would otherwise make this balancing even more difficult to maintain. The input or control voltage is supplied to a plurality of control windings in which windings 112 and 114 form a means for receiving one input signal, windings 116 and 118 provide another input to the amplifier, and windings 120 and 122 still a third input to the amplifier. The effect of the signal appearing on any of the control windings is as follows: Assume again a condition in which the terminal $x$ is positive and current is flowing through power windings 56 and 58. With the polarities of the windings as indicated, the direct current flowing through signal winding 112 will tend to cause core 66 to be driven into saturation earlier in the half cycle which results in a reduction in the average voltage drop across winding 56 and an increase in the voltage drop across the dummy load resistor 90; at the same time, the current flowing through winding 114 tends to drive the core 68 into saturation later in the half cycle and thereby effectively increases the average voltage drop across the dummy load resistor 94. Because of the action of the rectifiers 80 and 82, no significant voltage drop is attributable to current flowing through windings 60 and 62. From the foregoing, it will be obvious that the voltage drop across resistor 90 will exceed that across resistor 94 and there will be a significant output voltage measurable between terminals 100 and 102. During the next half cycle, the terminal $z$ is positive and the analogous relationship holds in respect to power winding 60 and 62 and the corresponding control windings 112 and 114. A reversal of the polarity of the control voltage will, of course, result in a reversal of the polarity of the output voltage measured between terminals 100 and 102.

It will be observed that amplifier stage 54 is the power or output section of the amplifier and that this amplifier operates to drive the torque motor 38. This torque motor constitutes a highly inductive load and it has been determined that this inductive load is responsible for an undesirable discontinuity in the transfer function of the amplifier in the region of null. In order to compensate for this discontinuity, the resistance-capacitance networks consisting of resistors 103 and 104 and capacitors 105 and 106 have been connected across the dummy load resistors in order to compensate for the inductance of the load and to make the load appear more nearly as a straight resistive load. This particular feature does not appear in any of stages 44, 46, 48 or 50. With respect to the particular signals appearing on the various control windings of amplifier stage 54, it will be observed that windings 120 and 122 are effectively connected across the output of the amplifier in series with the winding 124 of the torque motor. Connected as shown, these windings impart a certain amount of negative feedback to the amplifier for stability. Windings 112 and 114 are connected at the output of amplifier stage 48 and thereby supply the signal to the output stage from the proportional section of the amplifier. The input to the proportional section is supplied from the temperature reference circuit through a pair of wires 126 and 128 to the input of amplifier section 44 where it is amplified, further amplified in stages 46 and 48 and then supplied to the windings 112 and 114. A portion of the output of amplifier stage 48 is fed back to the input of stage 44 through a pair of leads 130 and 132 which are connected to lead 128 on opposite sides of an isolating resistor 134. Lead 130 contains a resistor 136 which acts to limit the magnitude of the feedback signal. The signal supplied on the windings 112 and 114 to the power stage 54 is, then, an amplified temperature error signal which has been amplified by means of an amplifier having proportional feedback. This type of amplification and feedback provides rapid response to an error signal as is well understood in the art and further discussion of the structure is believed unwarranted. The temperature error signal from the temperature reference circuit is also supplied through a pair of leads 138 and 140 to the input of amplifier stage 50. This stage is essentially the same as the stage previously described but must be designed such that very high gain is provided. The output from stage 50 is supplied to a pair of control windings 142 and 144 of stage 52. Amplifier stage 52 is essentially the same as stage 54 and includes a resistance-capacitance circuit connected between the output terminals 146 and 148 and the center tap $y$. In this stage, a pair of the control windings 152 and 154 have been connected together at each end and do not receive an input signal. The effect of this is to increase the effective time constant of the stage. The output of stage 52 is connected to input windings 116 and 118 of stage 54 through a pair of wires 156 and 158. Wire 156 carries a current limiting resistor 157. Also connected across the output of stage 52 is the primary winding 160 of a rate transformer 162, one side of winding 160 being connected to the output terminal 148 by means of a lead 164 through a limiting resistor 166 and the opposite end of winding 160 being connected to output terminal 146 through a lead 168. The secondary winding 170 of rate transformer 162 is connected through a pair of leads 172 and 174 to the wire 138 on the input of amplifier stage 50 across an isolating resistor 176. A resistor 178 is connected in lead 172 to limit the magnitude of the feedback signal which may be supplied from transformer 160.

The rate transformer 160, like transformers generally, has a frequency range over which its response may be substantially linear and a somewhat lower frequency range over which its response varies with the frequency of the signal applied on the input winding 160. This frequency range may be, for example, from zero to three cycles per second and it is over this range that the rate transformer 162 acts to provide negative feedback to the input of stage 50. When a change occurs in the temperature error signal, this change is reflected in a change in the output of stage 52 and the more rapidly this change occurs, the larger the signal that will be supplied by the secondary winding 170 to the input of stage 50. Where a rate component such as the transformer 162 is incorporated in a feedback loop around a high gain amplifier, its effect will be similar, mathematically and functionally, to the reciprocal of the effect which it normally has in a forward loop. In the present case it was desired to produce a magnetic amplifier having a very high gain and a very long time constant (of the order of 50–100 sec.) in order to produce the effect of an integrating system. Inasmuch as this time constant is far greater than that of any other component in the entire system, electrical or hydromechanical, this effect is produced over the operating range of the system and the system does tend to stabilize at what is effectively zero error rather than at a finite error value which is typical of proportional systems.

Figure 2:
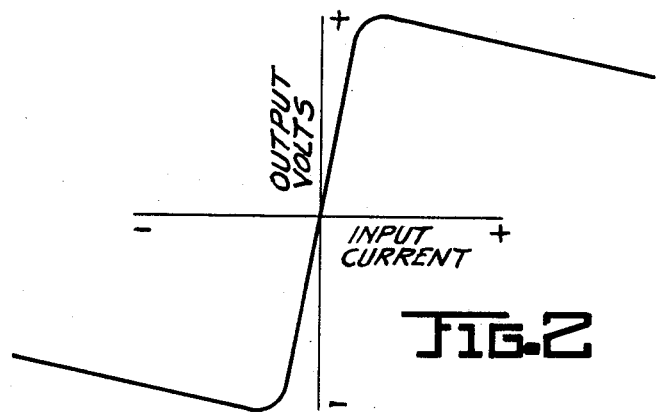
FIGURE 2 is a graph showing a typical transfer function of a high gain magnetic amplifier stage.
Figure 3:
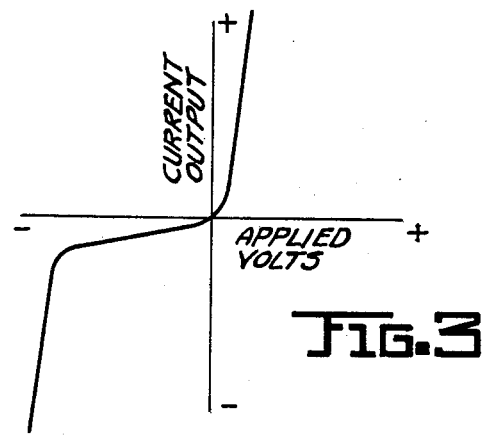
FIGURE 3 is a graph showing a typical operating characteristic of a Zener diode.
Figure 4:
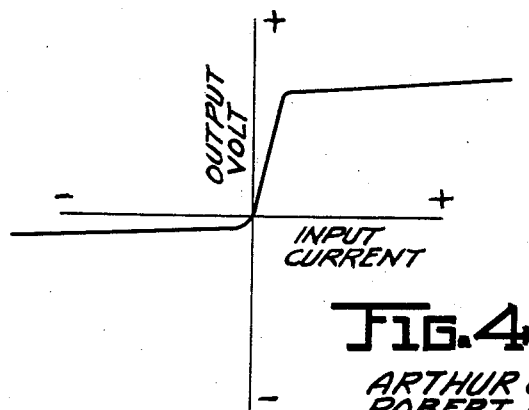
FIGURE 4 is a graph showing the transfer characteristic of the integrating amplifier section of the system shown in FIGURE 1.

High gain magnetic amplifiers have a transfer function similar to that shown in FIGURE 2 wherein the output rises very steeply to a knee of the curve after which the slope is reversed and further increases in input current actually result in a reduced output voltage. Inasmuch as the transformer 162 is connected across the output of the stage 52, it will be appreciated that the effect of having a negative slope in the transfer curve of stage 52 would be to cause the transformer 162 to provide positive feedback to the input of stage 50. This obviously would be undesirable and means have been provided to modify the gain of this stage to avoid the situation where the amplifier may be caused to operate on the negative slope of the transfer curve. Connected across the output of stage 52, effectively in parallel with the primary winding 160 of the transformer 162 is a gain limiting circuit which consists of a lead 180 connected to lead 156 which includes, in series, an inductor 182 and a diode block consisting of a pair of Zener diodes 184 and 186 connected in series opposition and a third diode 188 connected in parallel with Zener diodes 184 and 186 and the signal windings 190 and 192 and back to the output terminal 146. The output of the magnetic amplifier stage is a pulsating direct current signal and it is the function of the inductor 182 and a resistor 194 to serve as a filtering means to supply to the diode block a substantially smooth direct current voltage having a magnitude proportional to the output of the stage 52. The Zener diodes each have the characteristic approximately as shown in FIGURE 3 wherein they provide very little resistance to voltage applied in the forward direction across them and the output current rises very rapidly with said applied voltage. In the reverse direction, however, an appreciable amount of voltage may be applied across the diode with very little current output until a break point is reached, after which the curent output increases very rapidly. With the diode section connected as shown the output of stage 52 achieves a characteristic similar to that shown in FIGURE 4. The Zener diodes operate to cause the gain in the forward direction to break sharply and the slope of the transfer curve thereafter is very gradual but in a positive direction. While it would have been possible to arrange the system to have zero output voltage in the negative direction with negative input curent, it was found useful, for reasons of calibration, to make use of the slight knee in the curve of the Zener diode in the forward direction to permit a very small negative voltage output with negative input current.

The entire system operates as a trim on the fuel flow supplied to the engine by the main fuel control 26. When the fuel supplied to the engine is such that the turbine inlet temperature sensed by the thermocouple 28 is equal to the reference temperature requested by the variable resistor 30 of the temperature reference circuit, there will be no input signal to either of stages 44 or 50 and there will therefore be no output from stage 54 and the torque motor 38 will maintain the valve 40 in a closed position. Should the thermocouple 28 sense a temperature above that requested, a positive temperature error signal will be supplied to both of amplifier sections 44 and 50. The amplifier sections 44, 46 and 48 and the associated feedback loop act to provide a temperature error signal to the input windings 112 and 114 at stage 54 which is stabilized on a proportional basis. At the same time, this positive error signal will be amplified in stages 50 and 52 and a portion of the output of stage 52 will be fed back to the transformer 162 to provide a very long lag in the system so that the integrating section continues to provide a signal to control windings 116 and 118 acting to correct the position of the valve 40 for some time after the proportional section has finished making its correction. In this manner the system is caused to continually seek a null in the temperature error and substantially no error is inherent in the system. Accuracy of the control is, therefore, very good in that the control will normally maintain turbine inlet temperatures within a very few degrees at 1800° F. Although the electrical servo system shown herein has been described in connection with a temperature control for a gas turbine engine, it will be apparent to those skilled in the art that the teachings, insofar as the servo system itself is concerned, are susceptible to a wide variety of applications. It is contemplated, therefore, that modifications may be made to suit the requirements of any given application without departing from the scope of the present invention.

We claim:
1. In an electrical servo system including means producing a low level direct current signal proportional to a condition sensed, means producing a reference signal and comparing said reference signal with said direct current signal to produce an error signal, a magnetic amplifier for amplifying said error signal and electro-responsive means driven by said magnetic amplifier: said magnetic amplifier including an output stage having a plurality of signal windings, a first amplifier section connected to one of said signal windings including a plurality of stages and an inverse feedback loop around said stages to provide proportional stabilization, a second amplifier section connected to one of said signal windings including a plurality of stages and an inverse feedback loop around said stages incorporating a transformer to provide a characteristic of the second section approximating that of an integrating servo, the output stage of said second section including an additional circuit connected across its output terminals including in series a filter section, a feedback signal winding and a diode block incorporating at least one Zener diode.

2. An electrical servo system as set forth in claim 1 wherein the output from said output stage to said electro-responsive device is connected in series with one of said plurality of signal windings.

3. In an electrical servo system including means producing a direct current signal varying with a condition sensed, means producing a reference signal and comparing said reference signal with said condition responsive signal to produce an error signal, a magnetic amplifier for amplifying said error signal and electro-responsive means driven by said magnetic amplifier, the combination wherein said magnetic amplifier comprises an output stage having a plurality of direct current signal windings, a proportional amplifier section connected to one of said signal windings including an inverse feedback loop around said section to provide proportional stabilization, an integrating amplifier section connected to another of said signal windings including an inverse feedback loop incorporating a rate transformer to provide a feedback characteristic approximating that of an integrating servo, and means connected across the output of said integrating section effective to limit the gain of the last stage thereof such that said stage produces an increasing gain for an increasing input over the operating range of the section.

4. An electrical servo system as set forth in claim 3 wherein said last named means includes, in series, a filtering circuit, a feedback signal winding forming part of said last stage, and a pair of Zener diodes connected in opposing directions and a third diode connected in parallel with said two diodes.

5. An electrical servo system as set forth in claim 3 wherein said electro-responsive device includes a torque motor and means responsive to movement of said torque motor for varying instantaneous values of said condition.

6. An electrical servo system as set forth in claim 5 wherein the connections between said output stage and said torque motor include one of said direct current signal windings.

7. In an electrical servo system for controlling a condition to a desired value including means producing a voltage signal the magnitude and polarity of which is determined by the magnitude and sense of the departure of said condition from said desired value, amplification means for said signal, and electro-responsive means driven by said amplification means for varying instantaneous values of said condition, the combination wherein said amplification means comprises an output stage, a proportional amplifier section connected to said output stage to which said voltage signal is supplied, said section including an inverse feedback loop around said section to provide proportional stabilization, and an integrating amplifier section connected to said output stage to which said voltage signal is supplied including an inverse feedback loop incorporating a transformer to provide a characteristic approximating that of an integrating servo.

8. An electrical servo system as set forth in claim 7 wherein said electro-responsive means constitutes a highly inductive load and said output stage includes capacitance means connected across the output thereof to provide compensation for said inductive load.

9. An electrical servo system as set forth in claim 7 wherein said integrating amplifier section includes a magnetic amplifier final stage and means are connected across the output of said final stage effective to limit the gain thereof such that said stage produces an increasing gain for an increasing input over the operating range of the section.

10. An electrical servo system as set forth in claim 9 wherein said last named means includes, in series, a filtering circuit, a feedback signal winding forming part of said last stage, and at least one Zener diode.

References Cited in the file of this patent

UNITED STATES PATENTS

| | | |
|---|---|---|
| 2,654,999 | Berge | Oct. 13, 1953 |
| 2,716,208 | Coffin | Aug. 23, 1955 |
| 2,764,719 | Woodson | Sept. 25, 1956 |
| 2,813,236 | Westfelt | Nov. 12, 1957 |
| 2,829,322 | Silva | Apr. 1, 1958 |

OTHER REFERENCES

American Standard Definitions of Electrical Terms, page 124; published by A.I.E.E., 1942.